US012776297B2

(12) United States Patent
Wen

(10) Patent No.: US 12,776,297 B2
(45) Date of Patent: Oct. 27, 2026

(54) NOISE CANCELLATION METHOD, DEVICE AND APPARATUS AND COMPUTER READABLE STORAGE MEDIUM FOR EARPHONES

(71) Applicant: GOERTEK TECHNOLOGY CO., LTD, Qingdao (CN)

(72) Inventor: Xiaofeng Wen, Qingdao (CN)

(73) Assignee: GOERTEK TECHNOLOGY CO., LTD, Qingdao (CN)

( * ) Notice: Subject to any disclaimer, the term of this patent is extended or adjusted under 35 U.S.C. 154(b) by 193 days.

(21) Appl. No.: 18/718,459

(22) PCT Filed: Jun. 20, 2022

(86) PCT No.: PCT/CN2022/099730
§ 371 (c)(1),
(2) Date: Jun. 11, 2024

(87) PCT Pub. No.: WO2023/115853
PCT Pub. Date: Jun. 29, 2023

(65) Prior Publication Data
US 2025/0054483 A1 Feb. 13, 2025

(30) Foreign Application Priority Data
Dec. 20, 2021 (CN) ......................... 202111569487.1

(51) Int. Cl.
*G10K 11/16* (2006.01)
*G10K 11/178* (2006.01)

(52) U.S. Cl.
CPC .. *G10K 11/17825* (2018.01); *G10K 11/17875* (2018.01); *G10K 2210/1081* (2013.01); *G10K 2210/3026* (2013.01)

(58) Field of Classification Search
CPC ....... G10K 11/17825; G10K 11/17875; G10K 2210/1081; G10K 2210/3026
(Continued)

(56) References Cited

U.S. PATENT DOCUMENTS

2018/0122359 A1 5/2018 Liu et al.
2020/0084535 A1* 3/2020 Perkmann ................ H04R 1/02

FOREIGN PATENT DOCUMENTS

CN 106412788 A 2/2017
CN 108377436 A * 8/2018 ........... H04R 1/1083
(Continued)

OTHER PUBLICATIONS

International Search Report from International Application No. PCT/CN2022/099730 mailed Sep. 20, 2022.

*Primary Examiner* — Ammar T Hamid
(74) *Attorney, Agent, or Firm* — Shih IP Law Group, PLLC

(57) ABSTRACT

The present disclosure discloses an earphone noise cancellation method, device, apparatus and a non-transitory computer readable storage medium, wherein the method comprises: receiving a second noise cancellation amount of a second earphone corresponding to the first earphone, if a first noise cancellation amount of the first earphone meets a preset noise cancellation condition, obtaining a first noise cancellation difference value between the first noise cancellation amount and the second noise cancellation amount; and adjusting a noise cancellation parameter of at least one selected from a group consisting of the first earphone and the second earphone based on the first noise cancellation amount and the second noise cancellation amount, if the first noise cancellation difference value is greater than a preset difference.

6 Claims, 2 Drawing Sheets

(58) Field of Classification Search
USPC .......................................................... 381/71.6
See application file for complete search history.

(56) References Cited

FOREIGN PATENT DOCUMENTS

| | | | |
|---|---|---|---|
| CN | 109474865 | A | 3/2019 |
| CN | 110784804 | A | 2/2020 |
| CN | 111010642 | A | 4/2020 |
| CN | 211152189 | U | 7/2020 |
| CN | 111800687 | A | 10/2020 |
| CN | 111800690 | A | 10/2020 |
| CN | 111971975 | A | 11/2020 |
| CN | 113115157 | A | 7/2021 |
| CN | 114071309 | A | 2/2022 |

* cited by examiner

NOISE CANCELLATION METHOD, DEVICE AND APPARATUS AND COMPUTER READABLE STORAGE MEDIUM FOR EARPHONES

The present application claims priority to Chinese Patent Application No. 202111569487.1, entitled "noise cancellation method, device and apparatus and computer readable storage medium for earphones" filed with the China Patent Office on Dec. 20, 2021, the entire contents of which are incorporated into the present application by reference.

TECHNICAL FIELD

The present disclosure relates to a technical field of earphones, and more particularly, to a noise cancellation method, device and apparatus, and a non-transitory computer readable storage medium for earphones.

BACKGROUND

Earphones have been widely used in people's everyday life and work. Their functions for enjoying music and entertainment, earphones are also widely used to isolate noise and maintain a relatively quiet environment. However, the ability of earphones to block low-frequency noises is limited, affecting their effectiveness.

Active noise cancellation technology employs a method that generates a signal with the same amplitude but opposite phase as the external noise, thereby canceling the noise entering the earphone. This technology consists of feedforward noise cancellation and feedback noise cancellation. The noise signal captured by the feedforward microphone of the earphone represents the ambient noise, while the noise signal captured by the feedback microphone of the earphone represents the noise signal after the earphone's noise isolation and cancellation. The disparity between these two signals can reflect the active and passive noise cancellation effects of the earphones.

However, in the noise cancellation process of existing earphones, the left and right earphones independently select their own noise cancellation parameters to achieve optimal noise cancellation effects, without considering whether the noise cancellation effects of both sides are equivalent. For instance, an earphone well matched with an ear can achieve an optimal noise cancellation effect of 40 dB, whereas the other earphone which is poorly matched with an ear may only achieve a noise cancellation effect of 30 dB even after adjustment. The 10 dB difference between the left and right earphones can significantly affect the user experience, as the user can clearly perceive the disparity in noise cancellation effects between the two earphones.

The above description is only used to help understand the technical solution of the present disclosure, and should not be construed as prior art.

SUMMARY

A main purpose of the present disclosure is to provide a noise cancellation method, device and apparatus, and a non-transitory computer readable storage medium for earphones, to solve a technical problem that the difference between the noise cancellation effects of left and right earphones are relatively large during the noise cancellation in prior art, thereby impacting the user experience negatively.

To achieve the above purpose, the present disclosure provides an earphone noise cancellation method, applied to a first earphone, including:

receiving a second noise cancellation amount of a second earphone corresponding to the first earphone, if a first noise cancellation amount of the first earphone meets a preset noise cancellation condition, wherein the second noise cancellation amount meets the preset noise cancellation condition;

obtaining a first noise cancellation difference value between the first noise cancellation amount and the second noise cancellation amount; and adjusting a noise cancellation parameter of at least one selected from a group consisting of the first earphone and the second earphone based on the first noise cancellation amount and the second noise cancellation amount, if the first noise cancellation difference value is greater than a preset difference.

Further, the adjusting the noise cancellation parameter of at least one selected from a group consisting of the first earphone and the second earphone based on the first noise cancellation amount and the second noise cancellation amount may include:

determining a first adjustable noise cancellation parameter corresponding to the first earphone, if the first noise cancellation amount is less than the second noise cancellation amount;

adjusting the first earphone based on the first noise cancellation parameter, and obtaining a third noise cancellation amount corresponding to the first earphone after parameter adjustment; and sending a first noise cancellation parameter adjustment instruction to the second earphone, so that the second earphone adjusts the noise cancellation parameter, if a second noise cancellation difference value between the third noise cancellation amount and the second noise cancellation amount is greater than the preset difference.

Further, the adjusting the noise cancellation parameter of at least one selected from a group consisting of the first earphone and the second earphone based on the first noise cancellation amount and the second noise cancellation amount may include:

sending a second noise cancellation parameter adjustment instruction to the second earphone, so that the second earphone adjusts the noise cancellation parameter and feedbacks a fourth noise cancellation amount corresponding to the second earphone after parameter adjustment, if the first noise cancellation amount is greater than or equal to the second noise cancellation amount; and determining a second adjustable noise cancellation parameter corresponding to the first earphone and adjusting the first earphone based on the second noise cancellation parameter, if a third noise cancellation difference value between the first noise cancellation amount and the fourth noise cancellation amount is greater than the preset difference.

Further, before the receiving the second noise cancellation amount of the second earphone corresponding to the first earphone, if the first noise cancellation amount of the first earphone meets the preset noise cancellation condition, the method may further include:

obtaining a first noise signal acquired by a first acquisition device and a second noise signal acquired by a second acquisition device when the first earphone initiates active noise cancellation, wherein the first acquisition device is provided in a front cavity of the first earphone and the second acquisition device is provided in a rear cavity of the first earphone;

determining the first noise cancellation amount of the first earphone based on the first noise signal and the second noise signal; and determining that the first noise cancellation amount meets the preset noise cancellation condition, if the first noise cancellation amount is greater than or equal to a preset noise cancellation value.

Further, after the determining the first noise cancellation amount of the first earphone based on the first noise signal and the second noise signal, the method may further include:

determining a third adjustable noise cancellation parameter corresponding to the first earphone, if the first noise cancellation amount is less than the preset noise cancellation value;

adjusting the first earphone based on the third noise cancellation parameter, and going to perform obtaining the first noise signal acquired by the first acquisition device and the second noise signal acquired by the second acquisition device; and outputting a prompt message of re-wearing the first earphone, if the third adjustable noise cancellation parameter of the first earphone does not exist.

Further, to achieve the above purpose, the present disclosure also provides an earphone noise cancellation method, applied to a mobile terminal, including:

obtaining a first earphone noise cancellation amount corresponding to a first earphone and a second earphone noise cancellation amount corresponding to a second earphone;

obtaining a first earphone noise cancellation difference value between the first earphone noise cancellation amount and the second earphone noise cancellation amount, if the first earphone noise cancellation amount meets a preset noise cancellation condition and the second earphone noise cancellation amount meets the preset noise cancellation condition; and adjusting a noise cancellation parameter of at least one selected from a group consisting of the first earphone and the second earphone based on the first earphone noise cancellation amount and the second earphone noise cancellation amount, if the first earphone noise cancellation difference value is greater than a preset difference.

Further, the adjusting the noise cancellation parameter of at least one selected from a group consisting of the first earphone and the second earphone based on the first earphone noise cancellation amount and the second earphone noise cancellation amount may include:

determining a maximum noise cancellation amount and a minimum noise cancellation amount between the first earphone noise cancellation amount and the second earphone noise cancellation amount, and determining a first target earphone corresponding to the minimum noise cancellation amount and a second target earphone corresponding to the maximum noise cancellation amount;

sending a first parameter adjustment instruction to the first target earphone, wherein the first target earphone adjusts the noise cancellation parameter based on the first parameter adjustment instruction, to reduce a noise cancellation amount of the first target earphone, and feedback a third earphone noise cancellation amount of the first target earphone, which is a current earphone noise cancellation amount of the first target earphone; and sending a second parameter adjustment instruction to the second target earphone, if a second earphone noise cancellation difference value between the third earphone noise cancellation amount and the maximum noise cancellation amount is greater than a preset difference, wherein the second target earphone adjusts the noise cancellation parameter based on the second parameter adjustment instruction, to improve the noise cancellation amount of the second target earphone.

Further, to achieve the above purpose, the present disclosure also provides an earphone noise cancellation apparatus including:

a receiving module configured to receive a second noise cancellation amount of a second earphone corresponding to the first earphone, if a first noise cancellation amount of the first earphone meets a preset noise cancellation condition, wherein the second noise cancellation amount meets the preset noise cancellation condition;

an acquisition module configured to obtain a first noise cancellation difference value between the first noise cancellation amount and the second noise cancellation amount; and an adjustment module configured to adjust a noise cancellation parameter of at least one selected from a group consisting of the first earphone and the second earphone based on the first noise cancellation amount and the second noise cancellation amount, if the first noise cancellation difference value is greater than a preset difference.

Further, to achieve the above purpose, the present disclosure also provides a noise cancellation apparatus for earphones including a memory, a processor and an earphone noise cancellation program stored on the memory and executable by the processor, wherein when the earphone noise cancellation program is executed by the processor, steps of the above earphone noise cancellation method is performed.

Further, to achieve the above purpose, the present disclosure also provides a non-transitory computer readable storage medium, wherein an earphone noise cancellation program is stored on the non-transitory computer readable storage medium, and when the earphone noise cancellation program is executed by the processor, steps of the above earphone noise cancellation method is performed.

In the present disclosure, the second noise cancellation amount of the second earphone corresponding to the first earphone is received, if the first noise cancellation amount of the first earphone meets the preset noise cancellation condition, and then the first noise cancellation difference value between the first noise cancellation amount and the second noise cancellation amount is obtained; and then the noise cancellation parameter of at least one selected from a group consisting of the first earphone and the second earphone is adjusted based on the first noise cancellation amount and the second noise cancellation amount, if the first noise cancellation difference value is greater than the preset difference. In the present disclosure, the noise cancellation parameter of at least one selected from a group consisting of the first earphone and the second earphone is adjusted when the difference between the noise cancellation effect of the first earphone and the noise cancellation effect of the second earphone is large, to reduce the difference between the noise cancellation effect of the first earphone and the noise cancellation effect of the second earphone, for avoiding the situation that the user obviously feels the noise cancellation effects of the two earphones are different, and the user's experience is improved.

The principles, the features and advantage effects of the present disclosure will be further explained with referring to embodiments and the drawings.

DETAILED DESCRIPTIONS

It should be understood that the specific embodiments described herein are intended only to explain the present disclosure and are not intended to limit the present disclosure.

Figure 1:
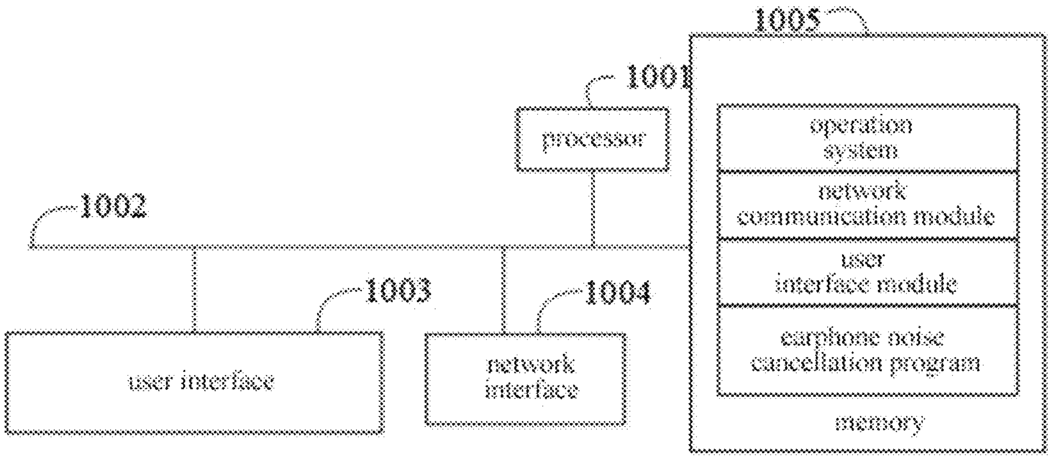
FIG. 1 is a schematic block diagram hardware of the noise cancellation apparatus according to an embodiment of the present disclosure.

FIG. 1 is a schematic block diagram hardware of the noise cancellation apparatus according to an embodiment of the present disclosure.

The noise cancellation apparatus for earphones of the embodiment of the present disclosure may be a PC-based device. As shown in FIG. 1, the earphone noise cancellation disclosure may include: a processor 1001, such as a CPU; a network interface 1004; a user interface 1003; a memory 1005; and a communication bus 1002. Herein, the communication bus 1002 is configured to realize the connection communication between these components. The user interface 1003 may include a display; and an input unit, such as a keyboard. Optionally, the user interface 1003 may further include a standard wired interface and a wireless interface. Optionally, the network interface 1004 may include a standard wired interface and a wireless interface (such as a WI-FI interface). The memory 1005 may be either a high-speed RAM memory or a non-volatile memory, such as a disk memory. Optionally, the memory 1005 may be a storage device independent of the above processor 1001.

Optionally, the noise cancellation apparatus for earphones may further include a camera, a RF (Radio Frequency) circuit, a sensor, an audio circuit, a WiFi module, and so on. Of course, the noise cancellation apparatus for earphones may also be configured with other sensors such as a barometer, a hygrometer, a thermometer, an infrared sensor, etc., which will not be detailed herein.

It may be understood by those skilled in the art that the terminal structure as shown in FIG. 1 does not define noise cancellation apparatus for earphones and may include more or fewer components than that shown in the drawing, or some parts might be combined, or disposed by different components.

As shown in FIG. 1, the memory 1005, as a computer storage medium, may include an operation system, a network communication module, a user interface module and an earphone noise cancellation program.

In the terminal as shown in FIG. 1, the network interface 1004 is mainly used to connect to the server for data communication with the server, the user interface 1003 is mainly used to connect a client terminal (a user terminal) for data communication with the client terminal, and the processor 1001 may be used to call the earphone noise cancellation program stored in the memory 1005.

In this embodiment, the noise cancellation apparatus for earphones may include: the memory 1005, the processor 1001, and the earphone noise cancellation program stored on the memory 1005 and executable by the processor 1001, wherein when the processor 1001 calls the earphone noise cancellation program stored in the memory 1005, steps of the earphone noise cancellation method in each of the following embodiments are performed.

Figure 2:
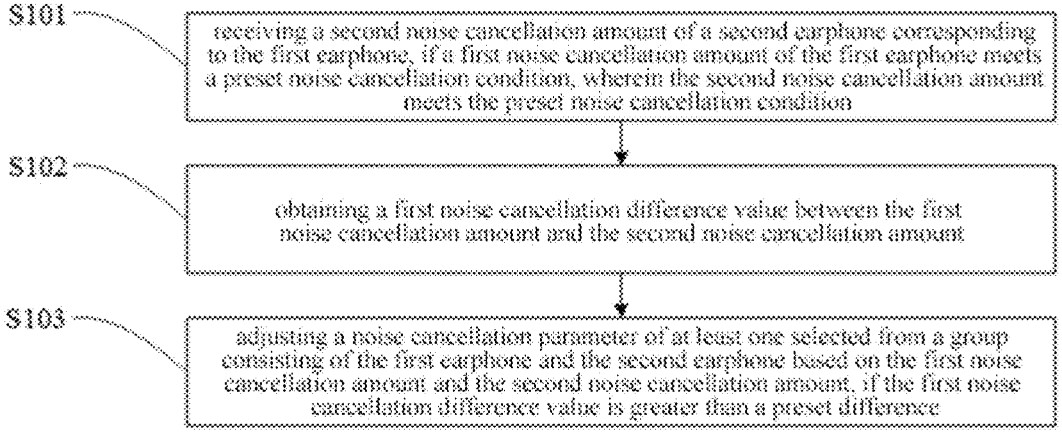
FIG. 2 is a flow diagram of the first embodiment of an earphone noise cancellation method of the present disclosure.

In addition, the present disclosure also provides an earphone noise cancellation method. FIG. 2 is a flow diagram of a first embodiment of the earphone noise cancellation method of the present disclosure.

In this embodiment, the earphone noise cancellation method is applied to a first earphone, and may include:

Step S101, receiving a second noise cancellation amount of a second earphone corresponding to the first earphone, if a first noise cancellation amount of the first earphone meets a preset noise cancellation condition, wherein the second noise cancellation amount meets the preset noise cancellation condition;

In this embodiment, the earphone includes a first earphone and a second earphone. When the first earphone is a left earphone, the second earphone is correspondingly a right earphone. Alternatively, when the first earphone is a right earphone, the second earphone is correspondingly a left earphone. A front cavity of the first earphone is provided with a first acquisition device, and a rear cavity of the first earphone is provided with a second acquisition device. The first acquisition device and the second acquisition device may both be microphones. Similarly, a front cavity and a rear cavity of the second earphone are also provided with acquisition devices.

When the earphone initiates active noise cancellation, the first earphone determines that the first noise cancellation amount of the first earphone according to the data acquired by the first acquisition device and the second acquisition device, and determines whether the first noise cancellation amount of the first earphone meets the preset noise cancellation condition. If the first noise cancellation amount meets the preset noise cancellation condition, the second noise cancellation amount of the second earphone is received. Herein, the second earphone determines the second noise cancellation in the same way as that of the first earphone, and sends the second noise cancellation to the first earphone when the second noise cancellation meets the preset noise cancellation condition.

Step S102, obtaining a first noise cancellation difference value between the first noise cancellation amount and the second noise cancellation amount;

In this embodiment, after the second noise cancellation amount is obtained, the first noise cancellation difference value between the first noise cancellation amount and the second noise cancellation amount is obtained, wherein the first noise cancellation difference value is the absolute value of the difference between the first noise cancellation amount and the second noise cancellation amount.

Step S103, adjusting a noise cancellation parameter of at least one selected from a group consisting of the first earphone and the second earphone based on the first noise cancellation amount and the second noise cancellation amount, if the first noise cancellation difference value is greater than a preset difference.

In this embodiment, when the first noise cancellation difference value is obtained, it is determined whether the first noise cancellation difference value is greater than the preset difference, wherein the preset difference may be reasonably set according to the user's hearing experience, for example, the preset difference may be set to 5 dB.

If the first noise cancellation difference value is greater than the preset difference, it is determined that the difference between the noise cancellation effect of the first earphone and the noise cancellation effect of the second earphone is large. In this case, the noise cancellation parameter of at least one selected from a group consisting of the first earphone and the second earphone is adjusted based on the first noise cancellation amount and the second noise cancellation amount, to reduce the difference between the noise cancellation effect of the first earphone and the noise cancellation effect of the second earphone. For example, the earphone having poor noise cancellation effect at current between the first earphone and the second earphone is determined, the noise cancellation parameter of the earphone having poor noise cancellation effect is adjusted, to improve the noise cancellation effect of the earphone having poor noise cancellation effect, and thus the difference between the noise cancellation effect of the first earphone and the noise cancellation effect of the second earphone is reduced. Alternatively, the earphone having better noise cancellation effect at current between the first earphone and the second earphone is determined, the noise cancellation parameter of the earphone having better noise cancellation effect is adjusted, to reduce the noise cancellation effect of the earphone having better noise cancellation effect, and thus the difference between the noise cancellation effect of the first earphone and the noise cancellation effect of the second earphone is reduced.

Herein, the noise cancellation parameter includes at least one selected from a group consisting of a gain parameter and a filtering period of an earphone filter.

According to the earphone noise cancellation method of the embodiment, the second noise cancellation amount of the second earphone corresponding to the first earphone is received, if the first noise cancellation amount of the first earphone meets the preset noise cancellation condition, and then the first noise cancellation difference value between the first noise cancellation amount and the second noise cancellation amount is obtained; and then the noise cancellation parameter of at least one selected from a group consisting of the first earphone and the second earphone is adjusted based on the first noise cancellation amount and the second noise cancellation amount, if the first noise cancellation difference value is greater than the preset difference. In the present disclosure, the noise cancellation parameter of at least one selected from a group consisting of the first earphone and the second earphone is adjusted when the difference between the noise cancellation effect of the first earphone and the noise cancellation effect of the second earphone is large, to reduce the difference between the noise cancellation effect of the first earphone and the noise cancellation effect of the second earphone, for avoiding the situation that the user obviously feels the noise cancellation effects of the two earphones are different, and the user's experience is improved.

A second embodiment of the earphone noise cancellation method of the present disclosure is provided on the basis of the first embodiment, in the second embodiment, step S103 may include:

Step S201, determining a first adjustable noise cancellation parameter corresponding to the first earphone, if the first noise cancellation amount is less than the second noise cancellation amount;

Step S202, adjusting the first earphone based on the first noise cancellation parameter, and obtaining a third noise cancellation amount corresponding to the first earphone after parameter adjustment; and Step S203, sending a first noise cancellation parameter adjustment instruction to the second earphone, so that the second earphone adjusts the noise cancellation parameter, if a second noise cancellation difference value between the third noise cancellation amount and the second noise cancellation amount is greater than the preset difference.

In this embodiment, when the first noise cancellation difference value is greater than the preset difference value, it is determined whether the first noise cancellation amount is less than the second noise cancellation amount. If the first noise cancellation amount is less than the second noise cancellation amount, it is determined whether there is a first adjustable noise cancellation parameter of the first earphone, that is, determine whether there is a noise cancellation parameter of the first earphone can be further adjusted to improve the cancellation effect at current. If there is, the noise cancellation parameter that can be further adjusted to improve the cancellation effect is the first adjustable noise cancellation parameter. By adjusting the first noise cancellation parameter, the noise cancellation effect of the first earphone can be improved and the difference between the noise cancellation effect of the first earphone and the noise cancellation effect of the second earphone can be reduced, and then the third noise cancellation amount corresponding to the first earphone after parameter adjustment is obtained. Herein, the method of acquiring the third noise cancellation amount is the same as that of the first noise cancellation amount, and thus the description on it will be omitted.

After the third noise cancellation amount is obtained, the second noise cancellation difference value between the third noise cancellation amount and the second noise cancellation amount is calculated, the second noise cancellation difference value is the absolute value of the difference between the third noise cancellation amount and the second noise cancellation amount. Further, it is determined whether the second noise cancellation difference value is greater than the preset difference, if the second noise cancellation difference value is greater than the preset difference, the first noise cancellation parameter adjustment instruction is sent to the second earphone, so that the second earphone adjusts the noise cancellation parameter, to reduce the noise cancellation effect of the second earphone, and thus the difference between the noise cancellation effect of the first earphone and the noise cancellation effect of the second earphone is reduced. Herein, when calculating the second noise cancellation difference value, it is necessary to ensure that the third noise cancellation amount meets the preset noise cancellation condition. If the third noise cancellation amount does not meet the preset noise cancellation condition, the step of determining the first adjustable noise cancellation parameter corresponding to the first earphone is performed again, until the noise cancellation amount of the first earphone after adjustment meets the preset noise cancellation condition. Then, the second noise cancellation difference value is calculated based on the third noise cancellation amount of the current first earphone.

It should be noted that if the first noise cancellation parameter is not obtained, the first noise cancellation parameter adjustment instruction is directly sent to the second earphone. If the second noise cancellation difference value is less than or equal to the preset difference, the first noise cancellation parameter adjustment instruction is not sent to the second earphone, and the first earphone and the second earphone operate based on the current noise cancellation parameter. Of course, if the noise cancellation difference value between the noise cancellation amount of the current second earphone and the third noise cancellation amount is still greater than the preset difference after the noise cancellation parameter of the second earphone is adjusted, the step of sending the first noise cancellation parameter adjustment instruction to the second earphone is performed again, until the noise cancellation difference value between the noise cancellation amount of the current second earphone and the third noise cancellation amount is less than or equal to the preset difference, or the noise cancellation amount of the second earphone does not meet the preset noise cancellation condition.

According to an embodiment of the earphone noise cancellation method, it is determined whether there is a first adjustable noise cancellation parameter of the first earphone, if the first noise cancellation amount is less than the second noise cancellation amount; the first earphone is adjusted based on the first noise cancellation parameter, and the third noise cancellation amount corresponding to the first earphone after parameter adjustment is obtained; and then the first noise cancellation parameter adjustment instruction is sent to the second earphone, so that the second earphone adjusts the noise cancellation parameter, if the second noise cancellation difference value between the third noise cancellation amount and the second noise cancellation amount is greater than the preset difference. In the present disclosure, by adjusting the noise cancellation parameter of at least one selected from a group consisting of the first earphone and the second earphone, the difference between the noise cancellation effect of the first earphone and the noise cancellation effect of the second earphone is reduced, to improve the user's listening experience.

A third embodiment of the earphone noise cancellation method of the present disclosure is provided on the basis of the first embodiment, wherein step S103 may include:

Step S301, sending a second noise cancellation parameter adjustment instruction to the second earphone, so that the second earphone adjusts the noise cancellation parameter and feedbacks a fourth noise cancellation amount corresponding to the second earphone after parameter adjustment, if the first noise cancellation amount is greater than or equal to the second noise cancellation amount; and Step S302, determining a second adjustable noise cancellation parameter corresponding to the first earphone and adjusting the first earphone based on the third noise cancellation parameter, if a third noise cancellation difference value between the first noise cancellation amount and the fourth noise cancellation amount is greater than the preset difference.

In this embodiment, the second noise cancellation parameter adjustment instruction is sent to the second earphone, if the first noise cancellation amount is greater than or equal to the second noise cancellation amount, it is determined whether there is, at current, an adjustable noise cancellation parameter of the second earphone, which may be further adjust to improve the noise cancellation effect of the second earphone, and adjust the second earphone base on the adjustable noise cancellation parameter. Further, if the current fourth noise cancellation amount of the second earphone meets the preset noise cancellation condition, feedbacks the fourth noise cancellation amount corresponding to the second earphone after parameter adjustment, to improve the noise cancellation effect of the second earphone, and reduces the difference between the noise cancellation effect of the first earphone and the noise cancellation effect of the second earphone. Herein, the method of acquiring the fourth noise cancellation amount is the same as that of the first noise cancellation amount, and thus the description on it will be omitted.

If the fourth noise cancellation amount is obtained, the third noise cancellation difference value between the fourth noise cancellation amount and the first noise cancellation amount is calculated. The third noise cancellation difference value is the absolute value of the difference between the fourth noise cancellation amount and the first noise cancellation amount, and it is determined whether the third noise cancellation difference value is greater than the preset difference. If the third noise cancellation difference value is greater than the preset difference, it is determined if there is a second adjustable noise cancellation parameter corresponding to the first earphone, and the first earphone is adjusted based on the third noise cancellation parameter. The second noise cancellation parameter is the noise cancellation parameter that can reduce the noise cancellation effect of the first earphone, to reduce the noise cancellation effect of the first earphone, and thus the difference between the noise cancellation effect of the first earphone and the noise cancellation effect of the second earphone is reduced.

It should be noted that, if the adjustable noise cancellation parameter of second earphone that can be further adjusted to improve noise cancellation effect does not exist at current, the second earphone feedbacks an amount needed to be adjusted, and the first earphone directly determines the second adjustable noise cancellation parameter corresponding to the first earphone based on the amount needed to be adjusted, and adjusts the first earphone based on the third noise cancellation parameter. If the third noise cancellation difference value is less than or equal to the preset difference, the first noise cancellation parameter adjustment instruction is not sent to the second earphone, and the first earphone and the second earphone operate based on the current noise cancellation parameter.

Of course, if after adjusting the second earphone, the noise cancellation difference value between the noise cancellation amount of the current second earphone and the first noise cancellation amount is still greater than the preset difference, the step of sending the second noise cancellation parameter adjustment instruction to the second earphone is performed again, until the noise cancellation difference value between the noise cancellation amount of the current second earphone and the first noise cancellation amount is less than or equal to the preset difference, or the noise cancellation amount of the second earphone does not meet the preset noise cancellation condition.

According to an embodiment of the earphone noise cancellation method, the second noise cancellation parameter adjustment instruction is sent to the second earphone, so that the second earphone adjusts the noise cancellation parameter and feedbacks the fourth noise cancellation amount corresponding to the second earphone after parameter adjustment, if the first noise cancellation amount is greater than or equal to the second noise cancellation amount; and then if the third noise cancellation difference value between the first noise cancellation amount and the fourth noise cancellation amount is greater than the preset difference, the second adjustable noise cancellation parameter corresponding to the first earphone is determined, and the first earphone is adjusted based on the third noise cancellation parameter. In the present disclosure, the noise cancellation parameter of at least one selected from a group consisting of the first earphone and the second earphone is adjusted to reduce the difference between the noise cancellation effect of the first earphone and the noise cancellation effect of the second earphone, to improve the user's listening experience.

A fourth embodiment of the earphone noise cancellation method of the present disclosure is provided on the basis of the above embodiments. In the present embodiment, before Step S101, the earphone noise cancellation method may further include:

Step S401, obtaining a first noise signal acquired by a first acquisition device and a second noise signal acquired by a second acquisition device when the first earphone initiates active noise cancellation, wherein the first acquisition device is provided in a front cavity of the first earphone and the second acquisition device is provided in a rear cavity of the first earphone;

Step S402, determining the first noise cancellation amount of the first earphone based on the first noise signal and the second noise signal; and Step S403, determining that the first noise cancellation amount meets the preset noise cancellation condition, if the first noise cancellation amount is greater than or equal to a preset noise cancellation value.

In this embodiment, the first earphone obtains the first noise signal acquired by the first acquisition device and the second noise signal acquired by the second acquisition device, and determines that the first noise cancellation amount corresponding to the first earphone based on the first noise signal and the second noise signal. Specifically, frequency spectrum analyses are performed to the first noise signal and the second noise signal, respectively, to obtain a first frequency spectrum analysis result and a second frequency spectrum analysis result, and the first noise cancellation amount is determined based on the first frequency spectrum analysis result and the second frequency spectrum analysis result. The first noise cancellation amount is equal to the second frequency spectrum analysis result minus the first frequency spectrum analysis result.

Then, it is determined whether the first noise cancellation amount is greater than or equal to the preset noise cancellation value. If the first noise cancellation amount is greater than or equal to the preset noise cancellation value, it is determined that the first noise cancellation amount meets the preset noise cancellation condition. Herein, the preset noise cancellation value may be reasonably set according to the hardware parameter of the earphone.

It should be noted that the method of acquiring the second noise cancellation amount of the second earphone is the same as that of the first noise cancellation amount, which will be omitted herein. Herein, the preset noise cancellation value is the minimum noise cancellation amount that meets the preset noise cancellation condition. If the noise cancellation amount is greater than the preset noise cancellation value, the noise cancellation effect of the earphone meets the preset noise cancellation condition.

According to an embodiment of the earphone noise cancellation method, when the first earphone initiates the active noise cancellation, the first noise signal acquired by the first acquisition device and the second noise signal acquired by the second acquisition device are obtained; the first noise cancellation amount of the first earphone is determined based on the first noise signal and the second noise signal; and it is determined that the first noise cancellation amount meets the preset noise cancellation condition, if the first noise cancellation amount is greater than or equal to the preset noise cancellation value. Therefore, the first noise cancellation amount might be accurately obtained and it is accurately determined whether the first noise cancellation amount meets the preset noise cancellation condition, and the accuracy for adjusting the noise cancellation parameter of at least one selected from a group consisting of the first earphone and the second earphone is improved, to further improve the user's experience.

A fifth embodiment of the earphone noise cancellation method of the present disclosure is provided on the basis on the fourth embodiment. In the present embodiment, after step S402, it may further include:

Step S404, determining a third adjustable noise cancellation parameter corresponding to the first earphone, if the first noise cancellation amount is less than the preset noise cancellation value;

Step S405, adjusting the first earphone based on the third noise cancellation parameter, and going to perform obtaining the first noise signal acquired by the first acquisition device and the second noise signal acquired by the second acquisition device; and Step S406, outputting a prompt message of re-wearing the first earphone, if the third adjustable noise cancellation parameter of the first earphone does not exist.

In this embodiment, it is determined the third adjustable noise cancellation parameter corresponding to the first earphone, if the first noise cancellation amount is less than the preset noise cancellation value, and the first earphone is adjusted based on the third noise cancellation parameter, to improve the noise cancellation amount of the first earphone, so that the noise cancellation amount of the first earphone after adjustment is greater than the preset noise cancellation value, to meet the preset noise cancellation condition.

Of course, if the third adjustable noise cancellation parameter of the first earphone does not exist, that is, the noise cancellation effect of the first earphone cannot be improved by adjusting the noise cancellation parameter, to improve the noise cancellation amount of the first earphone at current, output a prompt message of re-wearing the first earphone, to remind the user to re-wear the first earphone.

According to an embodiment of the earphone noise cancellation method, the third adjustable noise cancellation parameter corresponding to the first earphone is determined, if the first noise cancellation amount is less than the preset noise cancellation value; then the first earphone is adjusted based on the third noise cancellation parameter, and the method goes to perform obtaining the first noise signal acquired by the first acquisition device and the second noise signal acquired by the second acquisition device; and then output a prompt message of re-wearing the first earphone if the third adjustable noise cancellation parameter of the first earphone do not exist. In the present disclosure, the noise cancellation amount of the first earphone can be improved by adjusting the noise cancellation parameter of the first earphone or re-wearing the first earphone, to improve the noise cancellation effect of the first earphone, so that the noise cancellation amount of the first earphone meets the preset noise cancellation condition.

Figure 3:
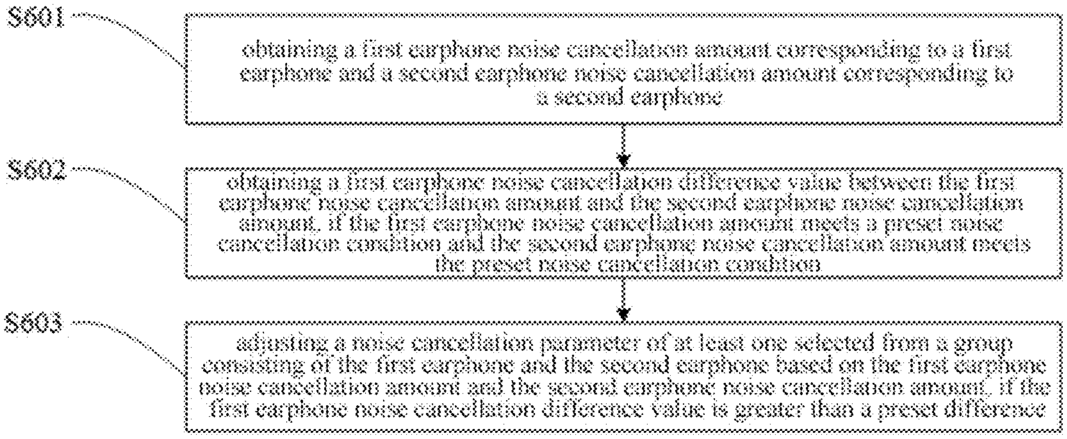
FIG. 3 is a flow diagram of the sixth embodiment of the earphone noise cancellation method of the present disclosure.

The present disclosure also provides an earphone noise cancellation method. FIG. 3 is a flow diagram of a sixth embodiment of the earphone noise cancellation method of the present disclosure.

In this embodiment, the earphone noise cancellation method is applied to a mobile terminal, and it may include:

Step S601, obtaining a first earphone noise cancellation amount corresponding to a first earphone and a second earphone noise cancellation amount corresponding to a second earphone;

In this embodiment, the earphone includes a first earphone and a second earphone. When the first earphone is a left earphone, the second earphone is correspondingly a right earphone. Alternatively, when the first earphone is a right earphone, the second earphone is correspondingly a left earphone. A front cavity of the first earphone is provided with a first acquisition device, and a rear cavity of the first earphone is provided with a second acquisition device. The first acquisition device and the second acquisition device may both be microphones. Similarly, a front cavity and a rear cavity of the second earphone are also provided with acquisition devices.

When the earphone initiates active noise cancellation, the mobile terminal obtains the first earphone noise cancellation amount corresponding to the first earphone and the second earphone noise cancellation amount corresponding to the second earphone.

Specifically, taking the first earphone noise cancellation amount as an example, the first earphone obtains a third noise signal acquired by the first acquisition device and a fourth noise signal acquired by the second acquisition device. The first earphone may directly send the third noise signal and the fourth noise signal to the mobile terminal, and the mobile terminal will determine the first earphone noise cancellation amount according to the third noise signal and the fourth noise signal, and determine whether the first earphone noise cancellation amount meets the preset noise cancellation condition. If it does not meet the preset noise cancellation condition, a parameter adjustment instruction is sent to the first earphone, so that the first earphone adjusts the noise cancellation parameter based on the parameter adjustment instruction, and feedbacks the third noise signal and the fourth noise signal currently acquired again, the mobile terminal determines a new first earphone noise cancellation amount according to the third noise signal and the fourth noise signal fed back again by the first earphone, until the new first earphone noise cancellation amount meets the preset noise cancellation condition. Alternatively, the first earphone determines that the first earphone noise cancellation amount corresponding to the first earphone based on the third noise signal and the fourth noise signal, and sends the first earphone noise cancellation amount to the mobile terminal when the first earphone noise cancellation amount meets the preset noise cancellation condition. Alternatively, the first earphone directly sends the first earphone noise cancellation amount to the mobile terminal, and the mobile terminal determines whether the first earphone noise cancellation amount meets the preset noise cancellation condition. If it does not meet the preset noise cancellation condition, the mobile terminal sends the parameter adjustment instruction to the first earphone, so that the first earphone adjusts the noise cancellation parameter based on the parameter adjustment instruction, and feedbacks the new first earphone noise cancellation amount again, until the new first earphone noise cancellation meets the preset noise cancellation condition.

Step S602, obtaining a first earphone noise cancellation difference value between the first earphone noise cancellation amount and the second earphone noise cancellation amount, if the first earphone noise cancellation amount meets a preset noise cancellation condition and the second earphone noise cancellation amount meets the preset noise cancellation condition; and In this embodiment, if the first earphone noise cancellation amount meets the preset noise cancellation condition and the second earphone noise cancellation amount meets the preset noise cancellation condition, the first earphone noise cancellation difference value between the first earphone noise cancellation amount and the second earphone noise cancellation amount is obtained, wherein the first earphone noise cancellation difference value is the absolute value of the difference between the first earphone noise cancellation amount and the second earphone noise cancellation amount.

Step S603, adjusting a noise cancellation parameter of at least one selected from a group consisting of the first earphone and the second earphone based on the first earphone noise cancellation amount and the second earphone noise cancellation amount, if the first earphone noise cancellation difference value is greater than a preset difference.

In this embodiment, if the first earphone noise cancellation difference value is obtained, it is determined whether the first earphone noise cancellation difference value is greater than the preset difference, wherein the preset difference may be reasonably set according to the user's hearing experience, for example, the preset difference may be set to 5 dB.

If the first earphone noise cancellation difference value is greater than the preset difference, it is determined that the difference between the noise cancellation effect of the first earphone and the noise cancellation effect of the second earphone is large. In this case, the noise cancellation parameter of at least one selected from a group consisting of the first earphone and the second earphone is adjusted based on the first noise cancellation amount and the second noise cancellation amount, to reduce the difference between the noise cancellation effect of the first earphone and the noise cancellation effect of the second earphone. For example, if it is determined that the first earphone or the second earphone the earphone having poor noise cancellation effect at current, the noise cancellation parameter of the earphone having poor noise cancellation effect is adjusted, to improve the noise cancellation effect of the earphone having poor noise cancellation effect, and thus the difference between the noise cancellation effect of the first earphone and the noise cancellation effect of the second earphone is reduced. Alternatively, the other earphone having better noise cancellation effect at current between first earphone and the second earphone is determined, the noise cancellation parameter of the earphone having better noise cancellation effect is adjusted, to reduce the noise cancellation effect of the earphone having better noise cancellation effect, and thus the difference between the noise cancellation effect of the first earphone and the noise cancellation effect of the second earphone is reduced.

Herein, the noise cancellation parameter includes at least one selected from a group consisting of a gain parameter and a filtering period of an earphone filter.

According to the earphone noise cancellation method of the embodiment, the first earphone noise cancellation amount corresponding to the first earphone and the second earphone noise cancellation amount corresponding to the second earphone are obtained; then the first earphone noise cancellation difference value between the first earphone noise cancellation amount and the second earphone noise cancellation amount is obtained if the first earphone noise cancellation amount meets the preset noise cancellation condition and the second earphone noise cancellation amount meets the preset noise cancellation condition; and then the noise cancellation parameter of at least one selected from a group consisting of the first earphone and the second earphone is adjusted based on the first earphone noise cancellation amount and the second earphone noise cancellation amount, if the first earphone noise cancellation difference value is greater than the preset difference. In the present disclosure, the noise cancellation parameter of at least one selected from a group consisting of the first earphone and the second earphone is adjusted when the difference between the noise cancellation effect of the first earphone and the noise cancellation effect of the second earphone is large, to reduce the difference between the noise cancellation effect of the first earphone and the noise cancellation effect of the second earphone, for avoiding the situation that the user obviously feels the noise cancellation effects of the two earphones are different, and the user's experience is improved.

A seventh embodiment of the earphone noise cancellation method of the present disclosure is provided on the basis of the sixth embodiment, in the seventh embodiment, step S603 may include:

Step S701: determining a maximum noise cancellation amount and a minimum noise cancellation amount between the first earphone noise cancellation amount and the second earphone noise cancellation amount, and determining a first target earphone corresponding to the minimum noise cancellation amount and a second target earphone corresponding to the maximum noise cancellation amount;

Step S702, sending a first parameter adjustment instruction to the first target earphone, wherein the first target earphone adjusts the noise cancellation parameter based on the first parameter adjustment instruction, to reduce a noise cancellation amount of the first target earphone, and feedback a third earphone noise cancellation amount of the first target earphone, which is a current earphone noise cancellation amount of the first target earphone; and Step S703, sending a second parameter adjustment instruction to the second target earphone, if a second earphone noise cancellation difference value between the third earphone noise cancellation amount and the maximum noise cancellation amount is greater than a preset difference, wherein the second target earphone adjusts the noise cancellation parameter based on the second parameter adjustment instruction, to improve the noise cancellation amount of the second target earphone.

In this embodiment, when the first earphone noise cancellation difference value is greater than the preset difference, the mobile terminal determines the maximum noise cancellation amount and the minimum noise cancellation amount between the first earphone noise cancellation amount and the second earphone noise cancellation amount, and determines that the first target earphone corresponding to the minimum noise cancellation amount and the second target earphone corresponding to the maximum noise cancellation amount.

Then, the mobile terminal sends the first parameter adjustment instruction to the first target earphone, wherein the first target earphone adjusts the noise cancellation parameter based on the first parameter adjustment instruction, to improve the noise cancellation amount of the first target earphone, and thus reduces the difference between the noise cancellation effect of the first earphone and the noise cancellation effect of the second earphone, and feedbacks the current third earphone noise cancellation amount of the first target earphone. Herein, the third earphone noise cancellation meets the preset noise cancellation condition.

If the third earphone noise cancellation amount is obtained, the second earphone noise cancellation difference value between the third earphone noise cancellation amount and the maximum noise cancellation amount is calculated. The second noise cancellation difference value is the absolute value of the difference between the third earphone noise cancellation amount and the second earphone noise cancellation amount, and it is determined whether the second earphone noise cancellation difference value is greater than the preset difference. If the second earphone noise cancellation difference value is greater than the preset difference, the second parameter adjustment instruction is sent to the second target earphone, wherein the second target earphone adjusts the noise cancellation parameter based on the second parameter adjustment instruction, to reduce the noise cancellation amount of the second target earphone, reducing the noise cancellation effect of the second earphone, so as to reduce the difference between the noise cancellation effect of the first earphone and the noise cancellation effect of the second earphone. Herein, when calculating the noise cancellation difference value of the second earphone, it should be ensured that the third earphone noise cancellation amount meets the preset noise cancellation condition. If the third earphone noise cancellation amount does not meet the preset noise cancellation condition, the step of sending the first parameter adjustment instruction to the first target earphone is performed again, until the noise cancellation amount of the first target earphone after adjustment (the new third earphone noise cancellation) meets the preset noise cancellation condition.

According to an embodiment of the earphone noise cancellation method, the maximum noise cancellation amount and the minimum noise cancellation amount between the first earphone noise cancellation amount and the second earphone noise cancellation amount are determined, and the first target earphone corresponding to the minimum noise cancellation amount and the second target earphone corresponding to the maximum noise cancellation amount are determined; then the first parameter adjustment instruction is sent to the first target earphone. Herein, the first target earphone adjusts the noise cancellation parameter based on the first parameter adjustment instruction, to reduce the noise cancellation amount of the first target earphone, and feedback the current third earphone noise cancellation amount of the first target earphone; and then the second parameter adjustment instruction is sent to the second target earphone, if the second earphone noise cancellation difference value between the third earphone noise cancellation amount and the maximum noise cancellation amount is greater than the preset difference, wherein the second target earphone adjusts the noise cancellation parameter based on the second parameter adjustment instruction, to improve the noise cancellation amount of the second target earphone. In the present disclosure, the noise cancellation parameter of at least one selected from a group consisting of the first earphone and the second earphone is adjusted to reduce the difference between the noise cancellation effect of the first earphone and the noise cancellation effect of the second earphone, to improve the user's listening experience.

Figure 4:
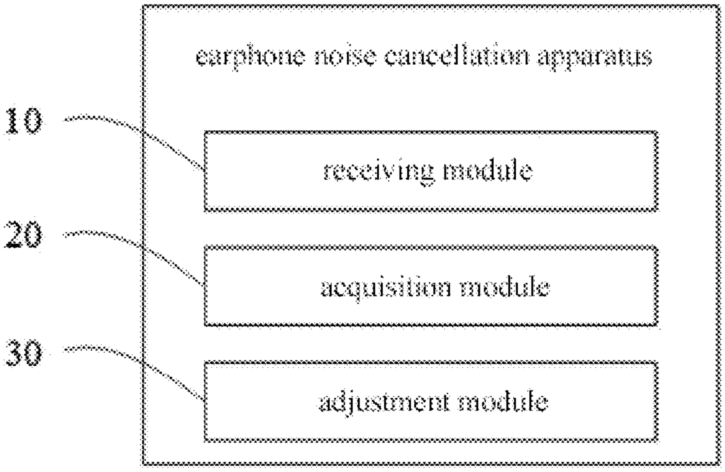
FIG. 4 is a diagram of a functional module of an embodiment of an earphone noise cancellation apparatus of the present disclosure.

The present disclosure also provides an earphone noise cancellation apparatus, referring to FIG. 4, the earphone noise cancellation apparatus may include:

- a receiving module 10 configured to receive a second noise cancellation amount of a second earphone corresponding to the first earphone, if a first noise cancellation amount of the first earphone meets a preset noise cancellation condition. Herein, the second noise cancellation amount meets the preset noise cancellation condition;

an acquisition module 20 configured to obtain a first noise cancellation difference value between the first noise cancellation amount and the second noise cancellation amount; and an adjustment module 30 configured to adjust a noise cancellation parameter of at least one selected from a group consisting of the first earphone and the second earphone based on the first noise cancellation amount and the second noise cancellation amount, if the first noise cancellation difference value is greater than a preset difference.

The methods executed by the above program units may refer to the embodiments of the earphone noise cancellation method of the present disclosure, and are not repeated herein.

The present disclosure also provides a non-transitory computer readable storage medium.

An earphone noise cancellation program is stored on the non-transitory computer readable storage medium of the present disclosure. When the earphone noise cancellation program is executed by the processor, steps of the earphone noise cancellation method described above are realized.

Herein, the method achieved when the earphone noise cancellation program operated on the processor is executed may refer to the embodiments of the earphone noise cancellation method of the present disclosure, and will be omitted herein.

In addition, the embodiments of the present disclosure also provide a computer program product, which includes the earphone noise cancellation program. The steps of the above earphone noise cancellation method are achieved when the earphone noise cancellation program is executed by the processor.

It should be noted that, in this context, the term "comprises", "include" or any other variation thereof is intended to cover non-exclusive inclusion so that a process, method, object or system including a set of elements includes not only those elements but also other elements not expressly listed. Alternatively, it may include elements inherent to the process, method, object or system. In the absence of further restrictions, the element defined by the sentence "including a . . . " does not preclude the existence of additional identical elements in the process, method, object or system including the element.

The serial number of the embodiment of the present disclosure is only for description and does not represent the superiority or inferiority of the embodiment.

From the above description of embodiment, it is clear to those skilled in the art that the above embodiments can be implemented by means of software plus the necessary common hardware platform, and of course by hardware, but in many cases the former is the preferred embodiment. Based on this understanding, the essential of the technical solution of the present disclosure or a part of the technical solution of the present disclosure which contributes to the prior art may be embodied in the form of a software product, which is stored in a storage medium (such as ROM/RAM, disk, optical disc) as described above, and includes several instructions for making a terminal device (which may be a mobile phone, a computer, a server, an air conditioner, or network equipment, etc.) perform the methods described in each embodiment of the present disclosure.

The above is only the preferred embodiment of the present disclosure, and does not therefore limit the patent scope of the present disclosure. Any equivalent structure or equivalent process transformation made by using the contents of the specification and drawings of the present disclosure, or directly or indirectly applied in other related technical fields, is similarly included in the scope of patent protection of the present disclosure.

What is claimed is:

1. An earphone noise cancellation method, applied to a first earphone, comprising:

receiving a second noise cancellation amount of a second earphone corresponding to the first earphone, if a first noise cancellation amount of the first earphone meets a preset noise cancellation condition, wherein the second noise cancellation amount meets the preset noise cancellation condition;

obtaining a first noise cancellation difference value between the first noise cancellation amount and the second noise cancellation amount; and adjusting a noise cancellation parameter of at least one selected from a group consisting of the first earphone and the second earphone based on the first noise cancellation amount and the second noise cancellation amount, if the first noise cancellation difference value is greater than a preset difference, wherein the adjusting the noise cancellation parameter of at least one selected from a group consisting of the first earphone and the second earphone based on the first noise cancellation amount and the second noise cancellation amount comprises:

determining a first adjustable noise cancellation parameter corresponding to the first earphone, if the first noise cancellation amount is less than the second noise cancellation amount;

adjusting the first earphone based on the first noise cancellation parameter, and obtaining a third noise cancellation amount corresponding to the first earphone after parameter adjustment; and sending a first noise cancellation parameter adjustment instruction to the second earphone, so that the second earphone adjusts the noise cancellation parameter, if a second noise cancellation difference value between the third noise cancellation amount and the second noise cancellation amount is greater than the preset difference.

2. An earphone noise cancellation method, applied to a first earphone comprising:

receiving a second noise cancellation amount of a second earphone corresponding to the first earphone, if a first noise cancellation amount of the first earphone meets a preset noise cancellation condition, wherein the second noise cancellation amount meets the preset noise cancellation condition;

obtaining a first noise cancellation difference value between the first noise cancellation amount and the second noise cancellation amount; and adjusting a noise cancellation parameter of at least one selected from a group consisting of the first earphone and the second earphone based on the first noise cancellation amount and the second noise cancellation amount, if the first noise cancellation difference value is greater than a preset difference, wherein the adjusting the noise cancellation parameter of at least one selected from a group consisting of the first earphone and the second earphone based on the first noise cancellation amount and the second noise cancellation amount comprises:

sending a second noise cancellation parameter adjustment instruction to the second earphone, so that the second earphone adjusts the noise cancellation parameter and feedbacks a fourth noise cancellation amount corresponding to the second earphone after parameter adjustment, if the first noise cancellation amount is greater than or equal to the second noise cancellation amount; and determining a second adjustable noise cancellation parameter corresponding to the first earphone and adjusting the first earphone based on the second noise cancellation parameter, if a third noise cancellation difference value between the first noise cancellation amount and the fourth noise cancellation amount is greater than the preset difference.

3. The earphone noise cancellation method claim 1, wherein before the receiving the second noise cancellation amount of the second earphone corresponding to the first earphone, if the first noise cancellation amount of the first earphone meets the preset noise cancellation condition, the method further comprises:

obtaining a first noise signal acquired by a first acquisition device and a second noise signal acquired by a second acquisition device when the first earphone initiates active noise cancellation, wherein the first acquisition device is provided in a front cavity of the first earphone and the second acquisition device is provided in a rear cavity of the first earphone; and determining the first noise cancellation amount of the first earphone based on the first noise signal and the second noise signal.

4. The earphone noise cancellation method of claim 3, wherein after the determining the first noise cancellation amount of the first earphone based on the first noise signal and the second noise signal, the method further comprises:

determining that the first noise cancellation amount meets the preset noise cancellation condition, if the first noise cancellation amount is greater than or equal to a preset noise cancellation value;

determining a third adjustable noise cancellation parameter corresponding to the first earphone, if the first noise cancellation amount is less than the preset noise cancellation value;

adjusting the first earphone based on the third noise cancellation parameter, and going to perform obtaining the first noise signal acquired by the first acquisition device and the second noise signal acquired by the second acquisition device; and outputting a prompt message of re-wearing the first earphone, if the third adjustable noise cancellation parameter of the first earphone does not exist.

5. An earphone noise cancellation method, applied to a mobile terminal, comprising:

obtaining a first earphone noise cancellation amount corresponding to a first earphone and a second earphone noise cancellation amount corresponding to a second earphone;

obtaining a first earphone noise cancellation difference value between the first earphone noise cancellation amount and the second earphone noise cancellation amount, if the first earphone noise cancellation amount meets a preset noise cancellation condition and the second earphone noise cancellation amount meets the preset noise cancellation condition; and adjusting a noise cancellation parameter of at least one selected from a group consisting of the first earphone and the second earphone based on the first earphone noise cancellation amount and the second earphone noise cancellation amount, if the first earphone noise cancellation difference value is greater than a preset difference, wherein the adjusting the noise cancellation parameter of at least one selected from a group consisting of the first earphone and the second earphone based on the first earphone noise cancellation amount and the second earphone noise cancellation amount comprises:

determining a maximum noise cancellation amount and a minimum noise cancellation amount between the first earphone noise cancellation amount and the second earphone noise cancellation amount, and determining a first target earphone corresponding to the minimum noise cancellation amount and a second target earphone corresponding to the maximum noise cancellation amount;

sending a first parameter adjustment instruction to the first target earphone, wherein the first target earphone adjusts the noise cancellation parameter based on the first parameter adjustment instruction, to reduce a noise cancellation amount of the first target earphone, and feedback a third earphone noise cancellation amount of the first target earphone, which is a current earphone noise cancellation amount of the first target earphone; and sending a second parameter adjustment instruction to the second target earphone, if a second earphone noise cancellation difference value between the third earphone noise cancellation amount and the maximum noise cancellation amount is greater than a preset difference, wherein the second target earphone adjusts the noise cancellation parameter based on the second parameter adjustment instruction, to improve the noise cancellation amount of the second target earphone.

6. A noise cancellation apparatus for earphones comprising a memory, a processor and an earphone noise cancellation program stored on the memory and executable by the processor, wherein when the earphone noise cancellation program is executed by the processor, steps of the earphone noise cancellation method of claim 1 is performed.

* * * * *